UNITED STATES PATENT OFFICE.

JOSEPH FRANCIS MALONEY, OF CLEVELAND, OHIO.

LUBRICATING-OIL.

1,384,703. Specification of Letters Patent. Patented July 12, 1921.

No Drawing. Application filed April 26, 1920. Serial No. 376,617.

*To all whom it may concern:*

Be it known that I, JOSEPH F. MALONEY, a citizen of the United States, residing at Cleveland, in the county of Cuyahoga and State of Ohio, have invented certain new and useful Improvements in Lubricating-Oils, of which the following is a specification.

This invention relates to lubricants specially adapted for use in connection with the vehicle springs of motor cars, and which may be used to loosen tight nuts on bolts, and for many other purposes; and it consists of the novel combination of ingredients hereinafter fully described and claimed.

In carrying out this invention the following ingredients are carefully mixed together in substantially the proportions stated.

50 gallons of lubricating oil and preferably that known as No. 28 paraffin oils.
15 pounds of lubricating graphite,
1½ gallons of ether,
30 gallons of acetone,
5 gallons of turpentine,
15 gallons of kerosene, and
50 gallons of creosote.

Any approved lubricating oil, such as used for lubricating the bearings of machinery, may be used. The lubricating graphite is in the form of an impalpably fine powder, and is what is known as "air floated" graphite. The other ingredients are of the kind and quality ordinarily sold. They are valuable on account of their penetrating qualities, and also for preventing rust. The creosote also assists by making the various ingredients mix together in a more satisfactory manner.

What I claim is:

A lubricant, comprising the following ingredients mixed together in substantially the following proportions: 50 gallons of paraffin lubricating oil, 15 pounds of lubricating graphite, 1½ gallons of ether, 30 gallons of acetone, 5 gallons of turpentine, 15 gallons of kerosene, and 50 gallons of creosote.

In testimony whereof I have affixed my signature.

JOSEPH FRANCIS MALONEY.